(12) United States Patent
Hillesund et al.

(10) Patent No.: US 7,733,740 B2
(45) Date of Patent: Jun. 8, 2010

(54) SENSOR MOUNT FOR MARINE SEISMIC STREAMER

(75) Inventors: Oyvind Hillesund, Houston, TX (US); Stian Hegna, Hovik (NO)

(73) Assignee: PGS Geophysical AS, Lysaker (NO)

( * ) Notice: Subject to any disclaimer, the term of this patent is extended or adjusted under 35 U.S.C. 154(b) by 159 days.

(21) Appl. No.: 11/731,372

(22) Filed: Mar. 30, 2007

(65) Prior Publication Data
US 2008/0074946 A1 Mar. 27, 2008

Related U.S. Application Data

(63) Continuation-in-part of application No. 11/525,677, filed on Sep. 22, 2006, now abandoned.

(51) Int. Cl.
G01V 1/38 (2006.01)
(52) U.S. Cl. .......................................... 367/20; 367/154
(58) Field of Classification Search .................... 367/20, 367/154, 153
See application file for complete search history.

(56) References Cited

U.S. PATENT DOCUMENTS

| 3,518,677 | A | * | 6/1970 | Florian | 367/154 |
| 5,521,885 | A | * | 5/1996 | Harvey | 367/154 |
| 5,600,608 | A | | 2/1997 | Weiss et al. | |
| 5,943,293 | A | * | 8/1999 | Luscombe et al. | 367/20 |
| 7,460,434 | B2 | * | 12/2008 | Stenzel et al. | 367/20 |
| 2004/0042341 | A1 | | 3/2004 | Tenghamn | |
| 2006/0023568 | A1 | * | 2/2006 | Fernihough et al. | 367/20 |
| 2006/0193203 | A1 | * | 8/2006 | Tenghamn et al. | 367/20 |

FOREIGN PATENT DOCUMENTS

GB 1348401 * 3/1974

OTHER PUBLICATIONS

S.P. Beerens, S. P. Van Ijsselmuide, C. Volwerk, E. Trouvé, Y Doisy; "*Flow Noise Analysis of Towed Sonar Arrays*", UDT99—Conference Proceedings Undersea Defense Technology, Jun. 29-Jul. 1, 1999, pp. 392-397, Nice, France, Nexus Media Limited, Swanley, Kent.
A.F. Heenan, J.F. Morrison; "*Turbulent boundary layers on axially-inclined cylinders. II. Circumferentially averaged wall-pressure wavenumber-frequency spectra*", Experiments in Fluids 31, Springer-Verlag, 2002, pp. 616-623, DOI 10.1007/s00348-001-0385-4.
A.P. Dowling; "*Underwater Flow Noise*", Theoretical and Computational Fluid Dynamics, Springer-Verlag, 1998, pp. 135-153.

* cited by examiner

*Primary Examiner*—Ian J Lobo
(74) *Attorney, Agent, or Firm*—E. Eugene Thigpen; Richard A. Fagin (57) ABSTRACT

A seismic streamer includes a jacket covering an exterior of the streamer. At least one strength member extends along the length of and disposed inside the jacket. At least one seismic sensor is mounted in a housing affixed to the at least one strength member. A void filling material fills the interstices inside the jacket. The housing is configured to isolate the at least one sensor from pressure variations in the void filling material, and the housing is configured to couple the at least one sensor to a body of water outside the streamer.

18 Claims, 5 Drawing Sheets

SENSOR MOUNT FOR MARINE SEISMIC STREAMER

CROSS-REFERENCE TO RELATED APPLICATIONS

This application is a continuation-in-part (CIP) of U.S. patent application Ser. No. 11/525,677 filed on Sep. 22, 2006 now abondoned, which is copending herewith.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic data acquisition equipment. More specifically, the invention relates to structures for a marine seismic streamer and structures for mounting sensors therein.

2. Background Art

Marine seismic surveying is typically performed using "streamers" towed near the surface of a body of water. A streamer is in the most general sense a cable towed by a seismic vessel. The cable has a plurality of seismic sensors disposed thereon at spaced apart locations along the length of the cable. The seismic sensors are typically hydrophones, but can also be any type of sensor that is responsive to the pressure in the water, or to changes therein with respect to time. The seismic sensors may also be any type of particle motion sensor or acceleration sensor known in the art. Irrespective of the type of such seismic sensors, the sensors generate an electrical or optical signal that is related to the pressure related or motion related parameter being measured by the sensors. The electrical or optical signals are conducted along electrical conductors or optical fibers carried by the streamer to a recording system. The recording system is typically disposed on the seismic vessel, but may be disposed elsewhere.

In a typical marine seismic survey, a seismic energy source is actuated at selected times, and a record, with respect to time, of the signals detected by the one or more sensors is made in the recording system. The recorded signals are later used for interpretation to infer structure of, fluid content of, and composition of rock formations in the Earth's subsurface. Structure, fluid content and mineral composition are typically inferred from characteristics of seismic energy that is reflected from subsurface acoustic impedance boundaries.

In order to improve the quality of seismic data interpretation, one goal of marine seismic streamer design is to reduce the various forms of noise detected by the seismic sensors. A typical marine seismic streamer can be up to several kilometers in length, and can include thousands of individual seismic sensors. Because of the weight of all of the materials used in a typical marine seismic sensor, because of the friction (drag) caused by the streamer as it is moved through the water, and because of the need to protect the seismic sensors, electrical and/or optical conductors and associated equipment from water intrusion, a typical seismic streamer includes certain features. First, the streamer includes one or more strength members to transmit axial force along the length of the streamer. The strength member is operatively coupled to the seismic vessel and thus bears all the axial loading caused by drag (friction) of the streamer in the water. The streamer also includes, as previously explained, electrical and/or optical conductors to carry electrical power and/or signals to the various sensors and (in certain streamers) signal conditioning equipment disposed in the streamer, and to carry signals from the various sensors to a recording station. The streamer also typically includes an exterior jacket that surrounds the other components in the streamer. The jacket is typically made from a strong, flexible plastic such as polyurethane, such that water is excluded from the interior of the jacket, and seismic energy can pass essentially unimpeded through the jacket to the sensors. A typical streamer also includes buoyancy devices at spaced apart locations along its length, so that the streamer is substantially neutrally buoyant in the water. The interior of the jacket is typically filled with oil or similar electrically insulating fluid that is substantially transparent to seismic energy.

The typical fluid-filled streamer structured as described above is well proven and has been used in the seismic surveying industry for a considerable time. However, there are some drawbacks to the fluid-filled streamer structure described above. One such drawback is leakage of the fluid into the surrounding water when a streamer section is damaged or the outer jacket is cut. This allows water to enter interstices of a streamer cable and could cause electrical failure of components in the streamer. At the same time, the streamer buoyancy is compromised. Because the fluid in the streamer is typically hydrocarbon-based, such as kerosene or light oil, such leakage can cause environmental damage. Damage to the streamer can occur while the streamer is being towed through the water or it can occur while the streamer is being deployed from or retrieved onto a winch on which streamers are typically stored on the seismic tow vessel.

Another drawback to using fluid-filled streamers is that detectable noise can be generated by vibrations resulting from the streamer being towed through the water. Such vibrations can cause internal pressure waves that travel through the fluid inside the streamer, such waves often being referred to as "bulge waves" or "breathing waves." Such noise is described, for example, in S. P. Beerens et al., *Flow Noise Analysis of Towed Sonar Arrays*, UDT 99—Conference Proceedings Undersea Defense Technology, June 29-Jul. 1, 1999, Nice, France, Nexus Media Limited, Swanley, Kent. Noise in the form of pressure waves can be detected by the seismic sensors, making identification of reflected seismic energy in the recorded signals more difficult.

Still another drawback to fluid-filled seismic streamers known in the art is transient motion of the various components of the streamer. Transient motion can induce detectable noise in the streamer. Ideally, during a seismic survey the entire streamer would move through the water at substantially constant velocity, and all the streamer components (i.e., the outer jacket, connectors, spacers, strength members, and filling fluid) would also move at the same constant velocity and thus not move with respect to each other. Under actual seismic survey conditions, however, motion of the seismic streamer is not uniform throughout and thus can lead to transient motion of various components, most notably the strength members. Transient motion can be caused by events such as pitching and heaving of the streamers, strumming of towing cables attached to the streamers (the strumming caused by vortex shedding on the cables), and operation of depth-control devices located on the streamers.

Transient motion of the strength members can cause transient longitudinal displacement of the spacers or connectors, causing pressure fluctuations in the fluid that are detected by the seismic sensors. Pressure fluctuations in the fluid that radiate away from the spacers or connectors can also cause the flexible outer jacket to bulge in and out as a traveling wave, giving this phenomenon its name. So called "bulge waves" can be detected by the seismic sensors. Another type of noise that can be caused by transient motion of the strength members will be further discussed below.

Other types of noise, generally called "flow noise", can also affect the signals detected by the seismic sensors. For example, vibrations in and along the seismic streamer can cause extensional waves in the outer jacket and can cause resonance transients to travel along the strength members. A turbulent boundary layer created around the outer jacket of the streamer by the act of towing the streamer in the water can also cause pressure fluctuations in the fluid filling the streamer.

In fluid-filled streamers, extensional waves in the jacket, resonance transients, and turbulence-induced noise are typically smaller in amplitude than bulge waves. Bulge waves are usually the largest source of vibration noise because these waves travel within the fluid core material filling the streamer and thus act directly on the seismic sensors. Nonetheless, all of these noise sources cumulatively can affect the detection of reflected seismic energy from the Earth formations below the water bottom, and thus affect the quality of seismic surveys.

Several methods and structures for streamers have been devised to reduce the foregoing types of noise. One such structure includes compartment isolation blocks within a fluid-filled streamer section to stop the vibration-caused bulge waves from traveling continuously along the entire length of the streamer. Another such noise reducing structure includes open-cell foam disposed in the interior of the streamer. The open-cell foam restricts the movement of the fluid in response to transient pressure changes and causes transient pressure energy to be dissipated into the outer jacket and the foam over a shorter longitudinal distance. Another structure used to reduce noise includes combining (summing) the signals from several longitudinally spaced apart seismic sensors to attenuate effects of relatively slow-moving bulge waves or similar noise. In such structures, an equal number of seismic sensors are positioned between or on both sides of each of the spacers in a streamer segment so that longitudinally equally spaced apart (from the spacer) pairs of seismic sensors detected equal yet opposite polarity pressure changes. Summing the signals from all the sensors in such a group can thus effectively cancel some of the noise.

Another approach to reducing the effects of bulge waves is to eliminate the fluid from the streamer sections entirely, so that no medium exists in which bulge waves can propagate. This approach is exemplified by so-called "solid" streamers, in which each streamer section is filled with a solid core material instead of a fluid. However, in any solid material, some shear waves will develop, which can increase some types of noise detected by the seismic sensors. Shear waves, of course, for the most part cannot propagate in a fluid filled streamer because fluids have substantially zero shear modulus (at least as compared with typical solid materials). Additionally, many conventional solid core materials are not substantially acoustically transparent to pressure waves, thus reducing the sensitivity of such streamers to reflected seismic energy. To deal with the foregoing limitations of using solid fill material in a streamer, another approach to reducing noise in streamers has been developed, which is to replace the fluid with a semi-solid or gelatin-like filler material. Such semi-solid filler material is flexible and acoustically transparent to seismic energy.

It is desirable to have a seismic streamer that has reduced amplitude of compressional waves resulting from tension transients, and that has reduced sensitivity to longitudinally traveling pressure waves in the void filler in the streamer and other types of noise passing along the streamer.

SUMMARY OF THE INVENTION

A seismic streamer according to one aspect of the invention includes a jacket covering an exterior of the streamer. At least one strength member extends along the length of and is disposed inside the jacket. At least one seismic sensor is mounted in a housing affixed to the at least one strength member. A void filling material fills the interstices inside the jacket. The housing is configured to isolate the at least one sensor from pressure variations in the void filling material, and the housing is configured to couple the at least one sensor to a body of water outside the streamer.

Other aspects and advantages of the invention will be apparent from the following description and the appended claims.

DETAILED DESCRIPTION

Figure 1:
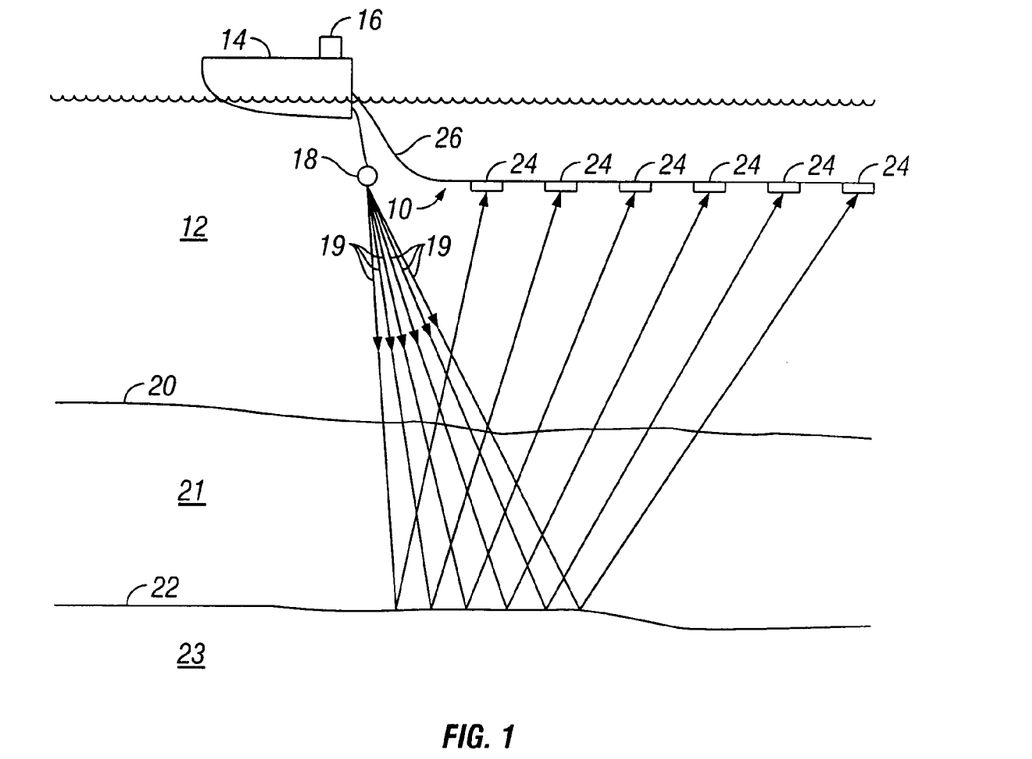
FIG. 1 shows typical marine seismic data acquisition using a streamer according to one embodiment of the invention.

FIG. 1 shows an example marine seismic data acquisition system as it is typically used in acquiring seismic data for a survey. A seismic vessel 14 moves along the surface of a body of water 12 such as a lake or the ocean. The marine seismic survey is intended to detect and record seismic signals reflected and/or refracted from the Earth's subsurface. The seismic vessel 14 includes source actuation, data recording and navigation equipment, shown generally at 16 and referred to for convenience as a "recording system." The seismic vessel 14, or a different vessel (not shown), can tow one or more seismic energy sources 18, or arrays of such sources in the water 12. The seismic vessel 14 or a different vessel tows at least one seismic streamer 10 near the surface of the water 12. The streamer 10 is coupled to the vessel 14 by a lead in cable 26. A plurality of sensor elements 24, or arrays of such sensor elements, are disposed at spaced apart locations along the streamer 10. The sensor elements 24, as will be explained in more detail below with reference to FIGS. 3 through 6, are formed by inserting a seismic sensor into a particularly formed housing. Such housings are disposed inside the streamer 10.

During operation, certain equipment (not shown separately) in the recording system 16 causes the source 18 to actuate at selected times. When actuated, the source 18 produces seismic energy 19 that emanates generally outwardly from the source 18. The energy 19 travels downwardly, through the water 12, and passes, at least in part, through the water bottom 20 into the formations 21, 23 below. Seismic energy 19 is at least partially reflected from one or more acoustic impedance boundaries 22 below the water bottom 20, and travels upwardly whereupon it may be detected by the sensors in each sensor element 24. Structure of the formations 21, 23, among other properties of the Earth's subsurface, can be inferred by travel time of the energy 19 and by characteristics of the detected seismic energy such as its amplitude and phase.

Figure 2:
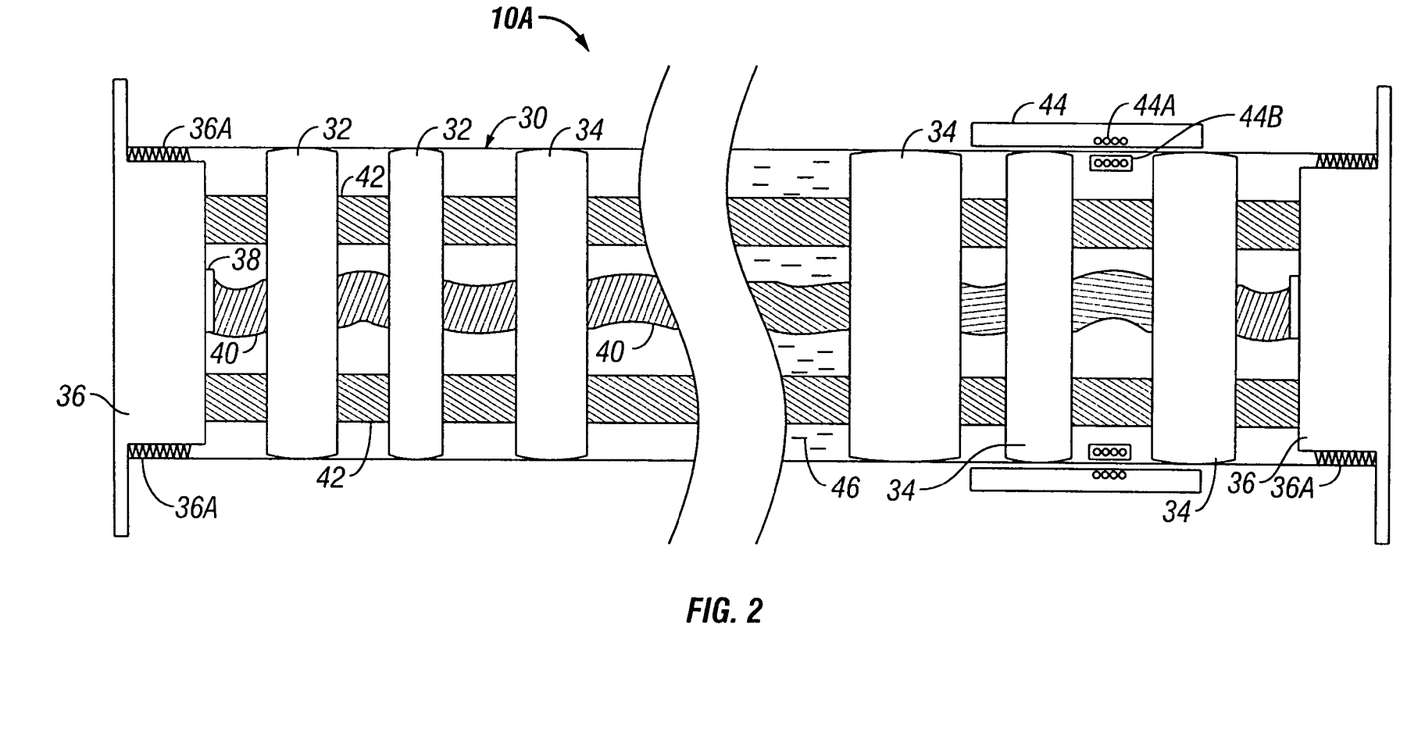
FIG. 2 shows a cut away view of one embodiment of a streamer segment according to the invention.

Having explained generally a method of operation of a marine seismic streamer, an example embodiment of a streamer according to the invention will be explained with reference to FIG. 2. FIG. 2 is a cut away view of a portion (segment) 10A of a typical marine seismic streamer (10 in FIG. 1). A streamer as shown in FIG. 1 may extend behind the seismic vessel (14 in FIG. 1) for several kilometers, and is typically made from a plurality of streamer segments 10A, one such segment being shown in FIG. 2, connected end to end behind the vessel (14 in FIG. 1).

The streamer segment 10A in the present embodiment may be about 75 meters overall length. A streamer such as shown at 10 in FIG. 1 thus may be formed by connecting a selected number of such segments 10A end to end. The segment 10A includes a jacket 30, which in the present embodiment can be made from 3.5 mm thick transparent polyurethane and has a nominal external diameter of about 62 millimeters. In each segment 10A, each axial end of the jacket 30 may be terminated by a coupling/termination plate 36. Each coupling/termination plate 36 may include rib elements 36A or similar gripping protrusions on an external surface of the coupling/termination plate 36 that is inserted into the end of the jacket 30. The rib elements 36A seal against the inner surface of the jacket 30 and grip the coupling/termination plate 36 to the jacket 30 when the jacket 30 is secured by and external clamp (not shown). In the present embodiment, two strength members 42 are coupled to the interior of each coupling/termination plate 36 and extend the length of the segment 10A. In a particular implementation of a streamer, the strength members 42 may be made from a fiber rope made from a fiber sold under the trademark VECTRAN, which is a registered trademark of Hoechst Celanese Corp., New York, N.Y. The strength members 42 transmit axial load along the length of the segment 10A. When one segment 10A is coupled end to end to another such segment (not shown in FIG. 2), the mating coupling/termination plate 36 are coupled together using any suitable connector, so that the axial force is transmitted through the coupling/termination plates 36 from the strength members 42 in one segment 10A to the strength member in the adjoining segment.

The streamer segment 10A can include a number of buoyancy spacers 32 disposed in the jacket 30 at axially spaced apart locations along the segment. Such spacers 32 may be coupled to the strength members 42 at spaced apart locations along their length. The buoyancy spacers 32 may be made from foamed polyurethane or other suitable, selected density material. The buoyancy spacers 32 have a density selected to provide the segment 10A preferably with approximately the same overall density as the water (12 in FIG. 1), so that the streamer (10 in FIG. 1) will be substantially neutrally buoyant in the water (12 in FIG. 1). As a practical matter, the buoyancy spacers 32 provide the segment 10A with an overall density very slightly less than that of fresh water. Appropriate overall density may then be adjusted in actual use by adding selected buoyancy spacers 32 and media used to fill interstices in the streamer segment 10A having suitable specific gravity.

The streamer segment 10A typically includes a conductor cable or harness 40 which can include a plurality of insulated electrical conductors (not shown separately), and may include one or more optical fibers (not shown). The conductors in the harness 40 conduct electrical and/or optical signals from the sensors (which will be further explained below with reference to FIGS. 3 through 6) to the recording system (16 in FIG. 1). The harness 40 may in some implementations also carry electrical power to various signal processing circuits (not shown separately) disposed in one or more segments 10A, or disposed elsewhere along the streamer (10 in FIG. 1).

The length of the harness 40 within a cable segment 10A is generally longer than the axial length of the segment 10A under the largest expected axial stress on the segment 10A, so that the electrical conductors and optical fibers in the harness 40 will not experience any substantial axial stress when the streamer 10 is towed through the water by a vessel. The conductors and optical fibers may be terminated in a connector 38 disposed in each coupling/termination plate 36 so that when the segments 10A are connected end to end, corresponding electrical and/or optical connections may be made between the electrical conductors and optical fibers in the cable 40 in adjoining segments 10A.

Sensors, which in the present embodiment may be hydrophones, can be disposed inside housings, which are shown in FIG. 2 generally at 34. The hydrophones in the present embodiment can be of a type known to those of ordinary skill in the art, including but not limited to those sold under model number T-2BX by Teledyne Geophysical Instruments, Houston, Tex. In the present embodiment, each streamer segment 10A may include 96 such hydrophones, disposed in arrays of sixteen individual hydrophones connected in electrical series. In a particular implementation of the invention, there are thus six such arrays, spaced apart from each other at about 12.5 meters. The spacing between individual hydrophones in each array should be selected so that the axial span of the array is at most equal to about one half the wavelength of the highest frequency seismic energy intended to be detected by the streamer (10 in FIG. 1). It should be clearly understood that the types of sensors used, the electrical and/or optical connections used, the number of such sensors, and the spacing between such sensors are only used to illustrate one particular embodiment of the invention, and are not intended to limit the scope of this invention. In other embodiments, the sensors may be particle motion sensors such as geophones or accelerometers. A marine seismic streamer having particle motion sensors is described in U.S. patent application Ser. No. 10/233,266, filed on Aug. 30, 2002, entitled, Apparatus and Method for Multicomponent Marine Geophysical Data Gathering, assigned to an affiliated company of the assignee of the present invention and incorporated herein by reference.

At selected positions along the streamer (10 in FIG. 1) a compass bird 44 may be affixed to the outer surface of the jacket 30. The compass bird 44 includes a directional sensor (not shown separately) for determining the geographic orientation of the segment 10A at the location of the compass bird 44. The compass bird 44 may include an electromagnetic signal transducer 44A for communicating signals to a corresponding transducer 44B inside the jacket 30 for communication along the conductor cable 40 to the recording system (16 in FIG. 1). Measurements of direction are used, as is known in the art, to infer the position of the various sensors in the segment 10A, and thus along the entire length of the streamer (10 in FIG. 1). Typically, a compass bird will be affixed to the streamer (10 in FIG. 1) about every 300 meters (every four segments 10A). One type of compass bird is described in U.S. Pat. No. 4,481,611 issued to Burrage and incorporated herein by reference.

In the present embodiment, the interior space of the jacket 30 (interstices) may be filled with a material 46 such as "BVF" (Buoyancy Void Filler), which may be a curable, synthetic urethane-based polymer. The BVF 46 serves to exclude fluid (water) from the interior of the jacket 30, to electrically insulate the various components inside the jacket 30, to add buoyancy to a streamer segment and to transmit seismic energy freely through the jacket 30 to the seismic sensors (not shown separately in FIG. 2). The BVF 46 in its uncured state is essentially in liquid form. Upon cure, the BVF 46 no longer flows as a liquid, but instead becomes substantially solid. However, the BVF 46 upon cure retains some flexibility to bending stress, substantial elasticity, and freely transmits seismic energy to the sensors. It should be understood that the BVF used in the present embodiment only is one example of a gel-like substance that can be used to fill the interior of the streamer. Other materials could be also used. For example, heating a selected substance, such as certain types of thermoplastic, above the melting point, and introducing the melted plastic into the interior of the jacket 30, and subsequent cooling, may also be used in a streamer according to the invention.

Figure 3:
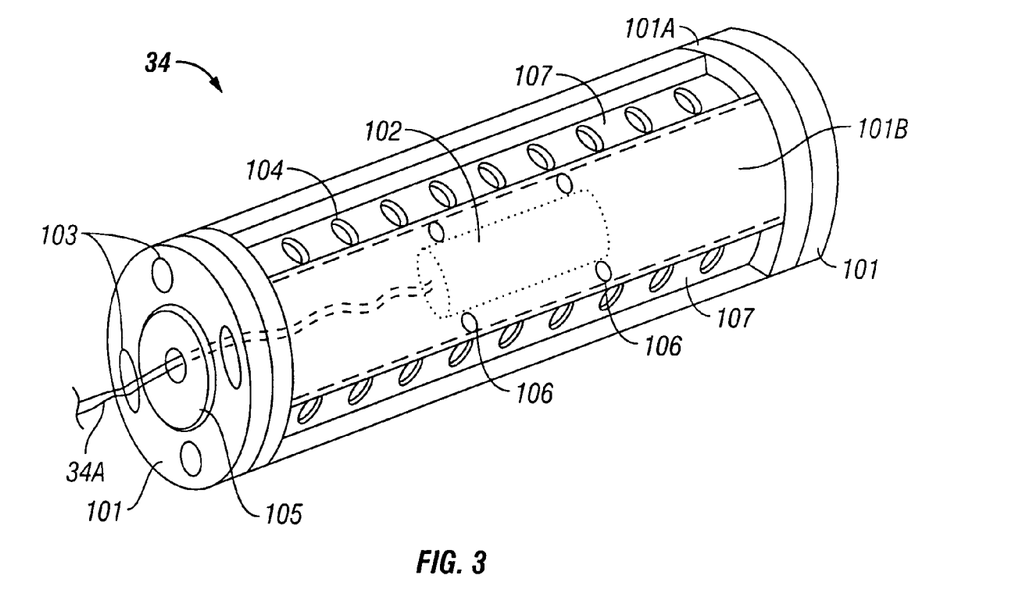
FIGS. 3, 4, 5 and 6 show various embodiments of a sensor housing used with a seismic streamer according to the invention.

Having explained general structure of a marine seismic streamer segment, example implementations of a sensor housing according to the invention will be explained with reference to FIGS. 3, 3A, 4, 5 and 6. Referring first to FIG. 3, the sensor housing 34 may be molded from rigid, high strength, high density plastic, or may be made from steel or aluminum of other rigid, high strength material. The sensor housing 34 can be generally cylindrical in shape and includes end plates 101 at its longitudinal ends, and a support structure disposed between the end plates that may have a number of different configurations as will be explained below. The support structure holds the end plates 101 at their respective longitudinal positions and provides a place to position a seismic sensor. The place in which the seismic sensor is positioned has a certain configuration as will be further explained below. Advantageously, the support structure can provide a place to position the sensor generally at or near the radial center of the streamer segment. The support structure, as will be further explained with reference to FIG. 3A also provides a passage for at least one strength member that is isolated from the place in which the seismic sensor is disposed.

The end plates 101 can be generally cylindrically shaped and each includes a surface 101A for sealingly engaging the inner surface of the streamer jacket (30 in FIG. 2). The housing 34 may define within the support structure a generally longitudinally oriented chamber 101B that extends along the length of the housing 34 and may be closed at one end and open at the other for insertion of a seismic sensor therein. The chamber 101B may be substantially coaxial with the housing 34. The chamber 101B has a diameter selected to receive the seismic sensor 102 therein. The seismic sensor 102 may be a hydrophone, geophone, accelerometer or any other type of seismic sensor known in the art. The seismic sensor 102 is preferably disposed near or at the radial center of the chamber 101B and may be retained in such position by soft elastomer rings 106 or the like. It is believed that arranging the chamber 101B in the present embodiment and in other embodiments will improve the performance of the streamer by reducing the susceptibility of the seismic sensors to noise introduced by interaction of the streamer jacket with the water as the streamer is moved through the water.

The housing 34 and the support structure also define one or more longitudinal through passages 103 that extend from one end plate 101 to the other end plate 101. The through passages 103 are preferably laterally disposed outside the chamber 101B. Where there is more than one such passage 103 they are preferably circumferentially spaced about the housing 34. The passages 103 provide conduits for the cable (40 in FIG. 2) and for the strength members (42 in FIG. 2). The strength members (42 in FIG. 2) may be adhesively bonded inside the passages 103 using techniques known in the art for bonding strength members to "sensor spacers."

Figure 3A:
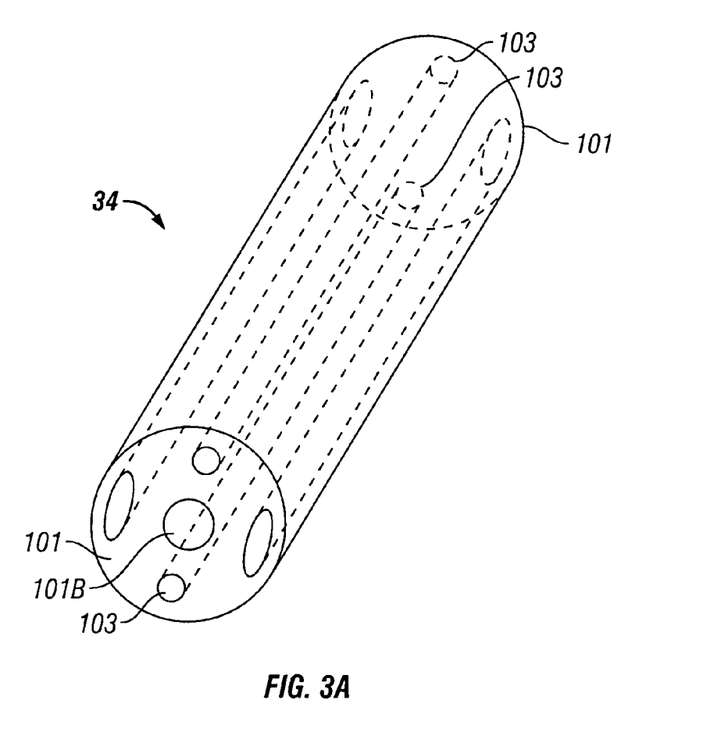
FIG. 3A shows a perspective view of one embodiment of a sensor housing showing through passages for cables and strength members.

Referring to FIG. 3A, the through passages 103, irrespective of the configuration of the support structure between the end plates 101, are isolated from the chamber (101B in FIG. 3). Thus, any pressure variations within the through passages 103 that may be transmitted along the void filler in the streamer will be isolated from the interior of the chamber (101B in FIG. 3) and thus from the seismic sensor (102 in FIG. 3) therein.

Referring once again to FIG. 3, the open end of the chamber 101B may be sealed after insertion of the sensor 102 therein by a cover plate 105. The cover plate 105 may be made from a material having similar mechanical properties as the housing 34. The cover plate 105 may provide sealing passage therethrough for signal leads 34A from the sensor 102, such that the signal leads 34A may be connected to the harness (40 in FIG. 2) as necessary. Alternatively, both end plates 101 may be closed (except for small sealing passage in at least one end plate for the signal leads 34A) to the chamber 101B and the support structure of the housing 34, disposed between the end plates 101 may have an opening (not shown) or door (not shown) large enough to enable insertion of the sensor 102 into the chamber 101B.

The exterior surface of the housing 34 may define one or more lateral depressions or channels 107 that may extend along some or all of the exterior surface of the housing 34 between the end plates 101. The channels 107 can include one or more ports 104 that extend through the lower surface of the channel 107 through to the chamber 101B. The channel 107 and the one or more ports 104 therein provide connection between the inner surface of the jacket (30 in FIG. 2) and the sensor 102 disposed in the chamber 101B. It is contemplated that when the streamer segment (10A in FIG. 2) is completed, the chamber 101B, and the entire volume of the one or more channels 107 and ports 104 will be filled with oil. In other embodiments, the chamber 101B, ports 104 and any channels 107 can be filled whatever fluid, gel or solid material is used to fill all the interstices in the complete streamer segment (such as BVF 46 in FIG. 2).

The effect of the structure of the housing 34 shown in FIG. 3, as well as other contemplated embodiments of the invention is to isolate the sensor 102 from pressure variations in the void filler in the streamer segment caused by noise sources such as stretching of the strength members (42 in FIG. 2), while providing effective coupling to the water in which the streamer is towed. By providing such isolation, the sensor housing 34 of the invention may provide improved performance by reducing the effect of longitudinally traveling pressure variations on the signals detected by the sensor 102.

Because the sensor 102 is held in position by elements such as the soft elastomer rings 106, to the extent that any vibrations from the strength members (42 in FIG. 2) are transmitted to the sensor housing 34, such transferred vibrations will be substantially attenuated by the elastomer rings 106.

Figure 4:
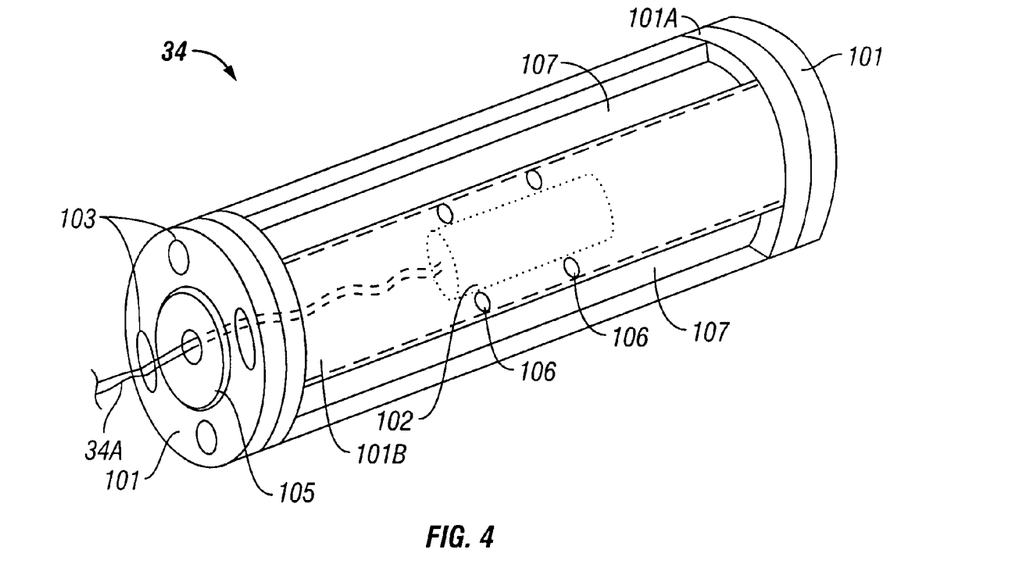

Another embodiment of a sensor housing 34 having a different support structure disposed between the end plates is shown in FIG. 4. In the embodiment of FIG. 4, the one or more channels 107 are completely open to the interior of the chamber 101B to provide less resistance between the chamber 101B and the water in which the streamer is towed.

Figure 5:
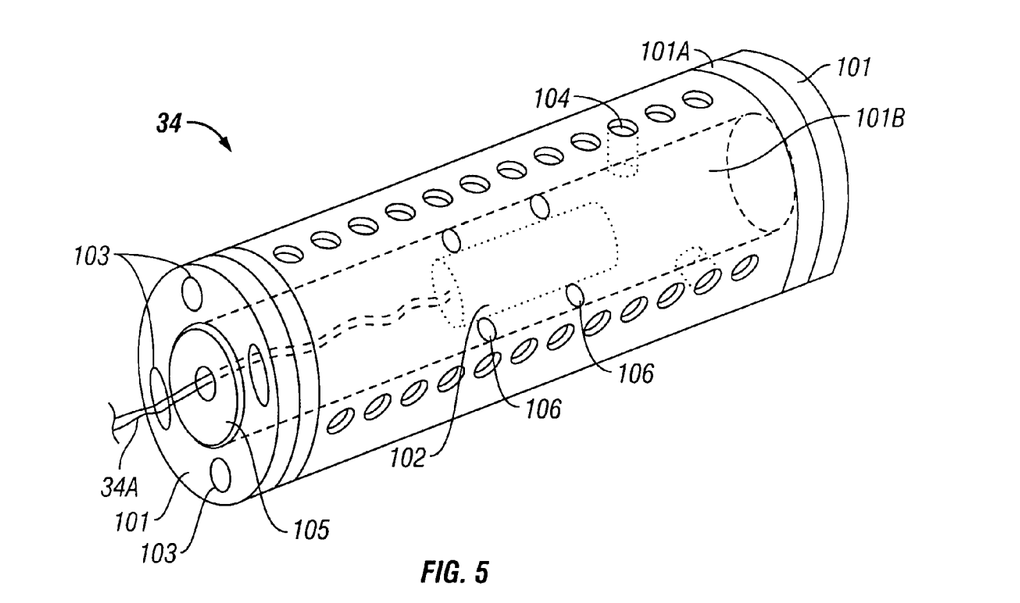

Another embodiment of a sensor housing 34 having yet another configuration for the support structure between the end plates is shown in FIG. 5. The embodiment shown in FIG. 5 includes a plurality of ports 104 extending between a substantially cylindrical exterior surface of the housing 34 and the interior of the chamber 101B.

Figure 6:
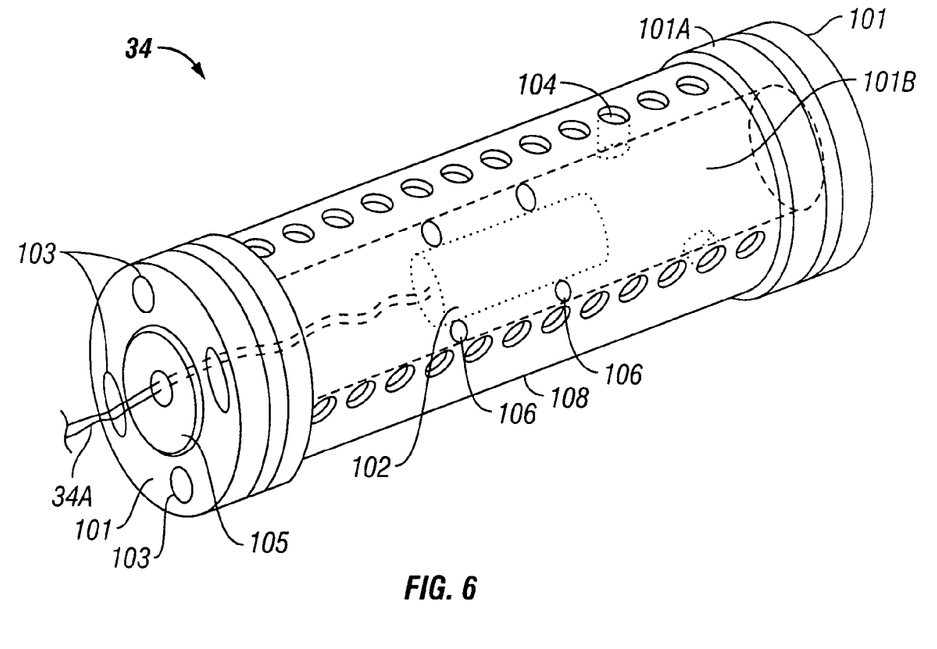

Another embodiment of a sensor housing 34 is shown in FIG. 6. The embodiment shown in FIG. 6 includes a support structure 108 disposed between the end plates 101 that is substantially cylindrical in exterior shape, and has a smaller diameter than the end plates 101. The support structure 108 may include a plurality of ports 104 that connect the interior of the chamber 101B with fluid outside the center section 108. When the streamer segment is assembled, such fluid will include oil or other void filling material, such as BVF (46 in FIG. 2) inside the jacket (30 in FIG. 2) and the water outside the jacket (30 in FIG. 2).

Streamers and streamer segments made according to the various aspects of the invention may have reduced noise resulting from longitudinally traveling pressure variations in the material filling the streamer, thus providing improved capacity to detect seismic signals in the water.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seismic streamer, comprising:
a jacket covering an exterior of the streamer;
at least one strength member extending along the length of and disposed inside the jacket;
at least one housing affixed to the at least one strength member;
at least one seismic sensor mounted proximate the center of the housing, the housing includes two longitudinally spaced apart end plates and a support structure disposed therebetween, the support structure maintaining the end plates in respective longitudinal position, the support structure defining a chamber in pressure communication with the fluid in which the streamer is disposed, the sensor disposed in the chamber; and
a void filling material filling interstices inside the jacket, the housing configured to isolate the at least one sensor from pressure variations in the void filling material, the housing configured to pressure couple the at least one sensor to a body of water outside the streamer, the at least one strength member laterally displaced from the center of the housing and pressure isolated from the at least one sensor.

2. The streamer of claim 1 wherein the support structure defines at least one passage between the end plates, the at least one passage isolated from the at least one sensor and configured to receive therein the at least one strength member.

3. The streamer of claim 1 wherein the jacket comprises polyurethane.

4. The streamer of claim 1 wherein the at least one strength member comprises fiber rope.

5. The streamer of claim 1 further comprising two strength members disposed inside the jacket.

6. The streamer of claim 1 further comprising buoyancy spacers disposed along the strength member and inside the jacket at spaced apart locations, the spacers having a density selected to provide the streamer with a selected overall density.

7. The streamer of claim 6 wherein the buoyancy spacers comprise foamed polyurethane.

8. The streamer of claim 1 further comprising a cable disposed inside the jacket, the cable having at least one of electrical conductors and an optical fiber, the cable configured to carry signals from the at least one seismic sensor to a recording system, and wherein the housing defines a passage between longitudinal end plates, the passage isolated from the chamber, the passage configured to receive the cable therethrough.

9. The streamer of claim 1 wherein the at least one sensor comprises a hydrophone.

10. The streamer of claim 1 further comprising a termination plate coupled to each axial end of the jacket, the termination plates each coupled to the strength member at an axial end thereof, the termination plates configured to couple to a corresponding termination plate in another segment of the streamer so as to transmit axial force therethrough.

11. The streamer of claim 1 wherein the housing includes at least one channel formed in an exterior surface thereof.

12. The streamer of claim 11 wherein the at least one channel comprises at least one port providing a passage between the at least one sensor and an exterior of the housing between an end plate disposed at each longitudinal end of the housing.

13. The streamer of claim 12 wherein the at least one channel is opened to an interior chamber defined within the housing between the end plates.

14. The streamer of claim 1 further comprising at least one port disposed between an end plate disposed at each longitudinal end of the housing and defining a passage from the at least one sensor to an interior surface of the jacket.

15. The streamer of claim 1 further comprising a cover plate affixed to one longitudinal end of one of an end plate disposed at each longitudinal end of the housing, the cover plate arranged to sealingly close an interior chamber defined by the housing, the cover plate configured to provide sealing passage therethrough of signal leads coupled to the at least one sensor.

16. The streamer of claim 1 further comprising at least one elastomer ring disposed between the sensor and an interior of a chamber defined by and in an interior of the housing.

17. The streamer of claim 1 wherein void space inside the housing is filled with at least one of a liquid and a gel.

18. The streamer of claim 1 wherein void space inside the housing is filled with a solid material.

* * * * *